United States Patent
Loehr et al.

(10) Patent No.: US 11,848,751 B2
(45) Date of Patent: *Dec. 19, 2023

(54) HARQ PROCESS FOR SIDELINK TRANSMISSION

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE); Ravi Kuchibhotla, Chicago, IL (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 0 days.

This patent is subject to a terminal disclaimer.

(21) Appl. No.: 17/982,372

(22) Filed: Nov. 7, 2022

(65) Prior Publication Data

US 2023/0056714 A1    Feb. 23, 2023

Related U.S. Application Data

(63) Continuation of application No. 16/827,221, filed on Mar. 23, 2020, now Pat. No. 11,496,249.
(Continued)

(51) Int. Cl.
*H04L 1/18* (2023.01)
*H04L 1/1812* (2023.01)
(Continued)

(52) U.S. Cl.
CPC .......... *H04L 1/1819* (2013.01); *H04L 1/1845* (2013.01); *H04L 1/1896* (2013.01);
(Continued)

(58) Field of Classification Search
CPC ... H04L 1/1819; H04L 1/1845; H04L 1/1896; H04L 2001/0097; H04W 4/40; H04W 72/23; H04W 92/18
(Continued)

(56) References Cited

U.S. PATENT DOCUMENTS

2016/0128082 A1* 5/2016 Chen ................. H04W 72/1221
                                                       370/329
2019/0044667 A1   2/2019 Guo et al.
(Continued)

FOREIGN PATENT DOCUMENTS

| WO | 2020057500 A1 | 3/2020 |
| WO | 2020125990 A1 | 6/2020 |
| WO | 2020194053 A1 | 10/2020 |

OTHER PUBLICATIONS

Mediatek Inc, "Enhancements to NR Uu for Advanced V2X Use Cases", 3GPP TSG RAN1 WG1 Meeting #96 R1-1901813, Feb. 25-Mar. 1, 2019, pp. 1-5.
(Continued)

*Primary Examiner* — Obaidul Huq
(74) *Attorney, Agent, or Firm* — Kunzler Bean & Adamson

(57) ABSTRACT

Apparatuses, methods, and systems are disclosed for sidelink HARQ operation. One apparatus includes a memory coupled to a processor, where the processor is configured to cause the second apparatus to receive a SL grant for a SL transmission using SL resources, the SL grant indicating a first HARQ process identified by a first HARQ process identifier, and to select a second SL HARQ process identified by a second SL HARQ process identifier for the SL transmission using the SL resources. The processor is configured to cause the second apparatus to transmit SCI
(Continued)

containing the second SL HARQ process identifier and to perform the SL transmission using the SL resources.

20 Claims, 6 Drawing Sheets

Related U.S. Application Data

(60) Provisional application No. 62/822,546, filed on Mar. 22, 2019.

(51) Int. Cl.
| | |
|---|---|
| *H04W 4/40* | (2018.01) |
| *H04L 1/1829* | (2023.01) |
| *H04L 1/1867* | (2023.01) |
| *H04W 72/23* | (2023.01) |
| *H04W 92/18* | (2009.01) |
| *H04L 1/00* | (2006.01) |

(52) U.S. Cl.
CPC ............ *H04W 4/40* (2018.02); *H04W 72/23* (2023.01); *H04L 2001/0097* (2013.01); *H04W 92/18* (2013.01)

(58) Field of Classification Search
USPC .......................................... 370/310, 328, 329
See application file for complete search history.

(56) References Cited

U.S. PATENT DOCUMENTS

| | | |
|---|---|---|
| 2020/0259600 A1 | 8/2020 | Cao et al. |
| 2021/0211239 A1 | 7/2021 | Fan et al. |
| 2021/0250131 A1 | 8/2021 | Fan et al. |
| 2021/0377912 A1* | 12/2021 | El Hamss ............. H04L 1/1854 |

OTHER PUBLICATIONS

ITL, "Sidelink HARQ Operation for NR V2X", 3GPP TSG-RAN WG2 Meeting #105 R2-1902074, Feb. 25-Mar. 1, 2019, pp. 1-2.

* cited by examiner

HARQ PROCESS FOR SIDELINK TRANSMISSION

CROSS-REFERENCE TO RELATED APPLICATIONS

This application claims priority to U.S. patent application Ser. No. 16/827,221—now U.S. Pat. No. 11,496,249—entitled "HARQ Process for Sidelink Transmission" and filed on Mar. 23, 2020 for Joachim Loehr, Karthikeyan Ganesan, Prateek Basu Mallick and Ravi Kuchibhotla, which application is incorporated herein by reference. U.S. Pat. No. 11,496,249 claims priority to U.S. Provisional Patent Application No. 62/822,546 entitled "Sidelink HARQ Operation for NR Vehicular Communication" and filed on Mar. 22, 2019 for Joachim Loehr, Karthikeyan Ganesan, Prateek Basu Mallick and Ravi Kuchibhotla, which application is incorporated herein by reference.

FIELD

The subject matter disclosed herein relates generally to wireless communications and more particularly relates to sidelink HARQ operation.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Positive-Acknowledgment ("ACK"), Application Programming Interface ("API"), Access Stratum ("AS"), Base Station ("BS"), Control Element ("CE"), Channel State Information ("CSI"), Connection Mode ("CM", this is a NAS state in 5GS), Core Network ("CN"), Control Plane ("CP"), Data Radio Bearer ("DRB"), Downlink Control Information ("DCI"), Downlink ("DL"), Discontinuous Transmission ("DTX"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access Network ("E-UTRAN"), Frequency Division Duplex ("FDD"), Frequency Division Multiple Access ("FDMA"), General Packet Radio Service ("GPRS"), Global System for Mobile Communications ("GSM"), Hybrid Automatic Repeat Request ("HARQ"), Home Subscriber Server ("HSS"), Home Public Land Mobile Network ("HPLMN"), Information Element ("IE"), Long Term Evolution ("LTE"), Mobility Management ("MM"), Mobility Management Entity ("MIME"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Network Slice Selection Assistance Information ("NSSAI"), Packet Data Unit ("PDU", used in connection with 'PDU Session'), Packet Switched ("PS", e.g., Packet Switched domain or Packet Switched service), Physical Broadcast Channel ("PBCH"), Physical Downlink Control Channel ("PDCCH"), Physical Downlink Shared Channel ("PDSCH"), Physical Hybrid ARQ Indicator Channel ("PHICH"), Physical Random Access Channel ("PRACH"), Physical Resource Block ("PRB"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Public Land Mobile Network ("PLMN"), Quality of Service ("QoS"), Radio Access Network ("RAN"), Radio Resource Control ("RRC"), Random-Access Channel ("RACH"), Receive ("RX"), Radio Link Control ("RLC"), Shared Channel ("SCH"), Session Management ("SM"), Session Management Function ("SMF"), Single Network Slice Selection Assistance Information ("S-NSSAI"), System Information Block ("SIB"), Transport Block ("TB"), Transport Block Size ("TBS"), Time-Division Duplex ("TDD"), Time Division Multiplex ("TDM"), Transmit ("TX"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, V2X communication allows vehicles to communicate with moving parts of the traffic system around them. Two resource allocation modes are used in LTE V2x communication and similar modes were introduced for NR v2x communication. Mode-1 corresponds to a NR network-scheduled V2X communication mode. Mode-2 corresponds to a NR UE-scheduled V2X communication mode. Mode-3 corresponds to an LTE network-scheduled V2X communication mode. Mode-4 corresponds to an LTE UE-scheduled V2X communication mode.

In LTE V2X HARQ operation is limited to blind retransmission without any HARQ feedback. NR V2X communication may support HARQ feedback signaling for SL transmission. However, it is unclear how SL HARQ processes are managed, e.g., for NR V2X communication.

BRIEF SUMMARY

Disclosed are procedures for sidelink HARQ operation. One method of a UE, e.g., for sidelink HARQ operation, includes receiving a SL grant for data transmission using SL resources. Here, the SL grant indicates a first HARQ process identified by a first HARQ process identifier. The method includes selecting a second HARQ process identified by a second HARQ process identifier for the data transmission using SL resources. The method includes transmitting SCI containing the selected second HARQ process identifier and transmitting the SL data using the SL resources.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
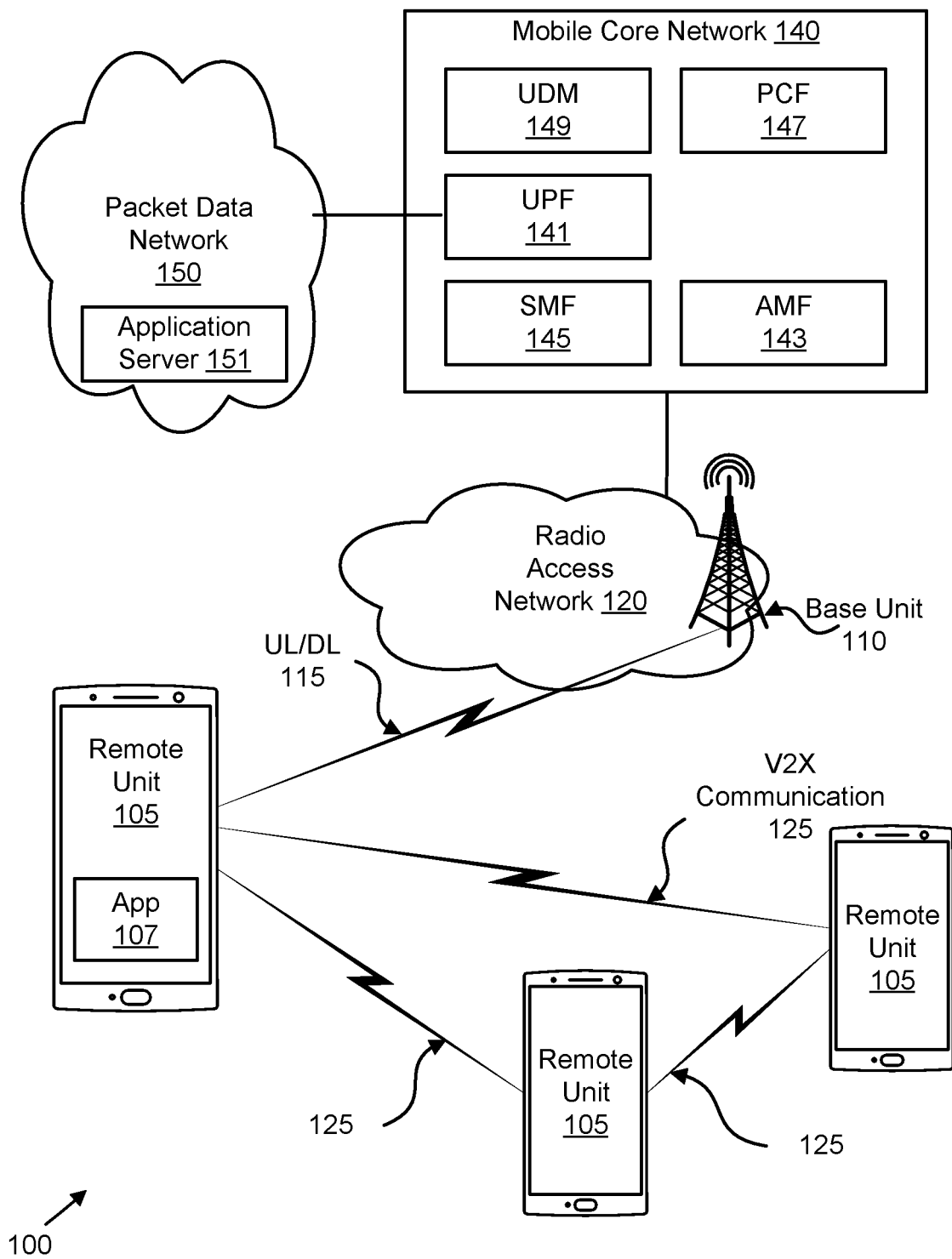
FIG. 1 is a schematic block diagram illustrating one embodiment of a wireless communication system for sidelink HARQ operation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for sidelink HARQ operation for UEs engaged in V2X communication. "V2X" (vehicle-to-everything) refers sidelink communications may include one or more of: "V2I" (vehicle-to-infrastructure) communications, "V2N" (vehicle-to-network), "V2V" (vehicle-to-vehicle) communications, "V2P" (vehicle-to-pedestrian), "V2D" (vehicle-to-device) and "V2G" (vehicle-to-grid) communications. A V2X UE refers to a UE capable of vehicular communication using 3GPP protocol(s).

Mode-3 and Mode-4 support direct LTE V2X communications but differ on how they allocate the radio resources. For Mode-3, resources are allocated by the cellular network, e.g., eNB. Mode-4 does not require cellular coverage, and vehicles (UEs) autonomously select their radio resources using a distributed scheduling scheme supported by congestion control mechanisms. Mode-4 is considered the baseline mode and represents an alternative to 802.11p or dedicated short range communications (DSRC).

Both resource allocation Mode-3 and 4 have been designed to satisfy the latency requirements and accommodate high Doppler spreads and high density of vehicles for V2X communications. Here, the maximum allowed latency varies between 20 and 100 ms, depending on the application. Mode-3 uses the centralized eNB scheduler as mentioned before. The vehicular UE and eNB use the Uu interface to communicate, e.g., sending of BSR/SR from the transmitting V2X UE to the eNB and receiving in response a SL grant on the PDCCH (carried in DCI).

Mode-4 uses the PC5 interface, which offers direct LTE sidelink (SL) between two vehicular UEs. Mode-4 employs distributed UE scheduling and operates without infrastructure support, even when the UEs is in eNB coverage. Note that LTE sidelink resources are shared with the LTE uplink. Both LTE duplexing modes (e.g., time and frequency division duplexing) are supported. Mode-4 uses a specific resource pool configuration and Semi-Persistent Scheduling ("SPS") to select and reserve resources for transmission.

SPS was introduced in LTE for supporting services that require deterministic latency, such as voice. Mode-4 adopts this concept and uses sensing to determine suitable semi-persistent transmission opportunities, e.g., the set of sub-frames and sub-channels for V2X transmission. A candidate single-subframe resource consists of from one up to L contiguous subchannels in a single subframe, depending on the message size. The UE selects a set of candidate resources within the selection window that spans a number of subframes and contains M single-subframe resources. Parameters T1 and T2 define the selection window. T2 is determined as a function of the latency requirement. The UE continuously monitors subframes and takes notes of decoded SCI and SL received signal strength indicator (S-RSSI) measurements. In certain embodiments, the UE considers the last 1000 subframes for selecting candidate resources.

As mentioned above, NR V2X design uses LTE V2X operation as a baseline. NR V2X also supports both a centralized scheduling mode (e.g., network-scheduled) and a distributed scheduling mode (e.g., UE-scheduled). The two resource allocation modes in NR V2X are referred to as resource allocation Mode-1 and Mode-2.

In various embodiments, NR V2X operation supports HARQ with HARQ feedback signaling for SL transmissions, e.g., at least for unicast and potentially for groupcast SL transmission. As noted above, LTE V2X HARQ operation is limited to blind retransmissions without any HARQ feedback and is thus unable to provide a baseline for NR V2X HAR operation with HARQ feedback for SL transmission. This raises several questions on how the sidelink HARQ processes are managed respectively maintained for the different cast types, e.g., unicast, groupcast and broadcast, and resource allocation modes.

The present disclosure outlines several methods for an efficient SL HARQ protocol operation for NR V2X. In particular, the HARQ operation for a SL transmission in the resource allocation Mode-1 is disclosed. Furthermore, the UE behavior for cases when the transmitting V2X UE switches the cast type for different HARQ (re)transmissions of a TB transmitted on the PSSCH is disclosed.

FIG. 1 depicts a wireless communication system 100 for sidelink HARQ operation in NR V2X communication for wireless devices communicating V2X messages 125, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for sidelink HARQ operation in NR V2X communication apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In various embodiments, the remote units 105 may communicate directly with each other (e.g., device-to-device communication) using V2X communication signals 125. Here, V2X transmissions may occur on V2X resources. As discussed above, a remote unit 105 may be provided with different V2X communication resources for different V2X modes. Mode-1 corresponds to a NR network-scheduled V2X communication mode. Mode-2 corresponds to an NR UE-autonomous V2X communication mode. Mode-3 corresponds to an LTE network-scheduled V2X communication mode. Mode-4 corresponds to an LTE UE-scheduled V2X communication mode.

Moreover, the remote units 105 implement SL HARQ processes for at least some data transferred over V2X communication signals 125. In certain embodiments, a transmitting remote unit 105 selects the HARQ process for a SL transmission on PSSCH. In certain embodiments, the HARQ processes are shared between Mode-1 and Mode-2 SL communications. In certain embodiments, the HARQ processes are shared between unicast, groupcast, and broadcast transmissions.

For SL HARQ operation in Mode-1, the transmitting remote unit 105 may select the HARQ process autonomously, which may be different to the HARQ process ID signaled within a SL grant. As the purpose of HARQ process ID in SL grant is to identify together with the NDI whether SL resource for a HARQ retransmission of a previously scheduled SL TB are allocated or whether SL resources for an initial HARQ transmissions are allocated, the base unit 110 may alternatively use another identifier, such as a SL grant ID, to identify a retransmission or an initial grant.

Where retransmission is required, the remote unit 105 may switch transmission cast type for the retransmission. For example, if the initial HARQ transmission is done in group cast manner, then HARQ retransmission(s) may be done in unicast manner. In various embodiments, the remote unit 105 uses the same HARQ process for transmitting HARQ retransmission to multiple receiving V2X remote units 105.

In the following descriptions, the term RAN node is used for the base station, but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting serving cells/carriers being configured for Sidelink Communication over PC5 interface.

Figure 2:
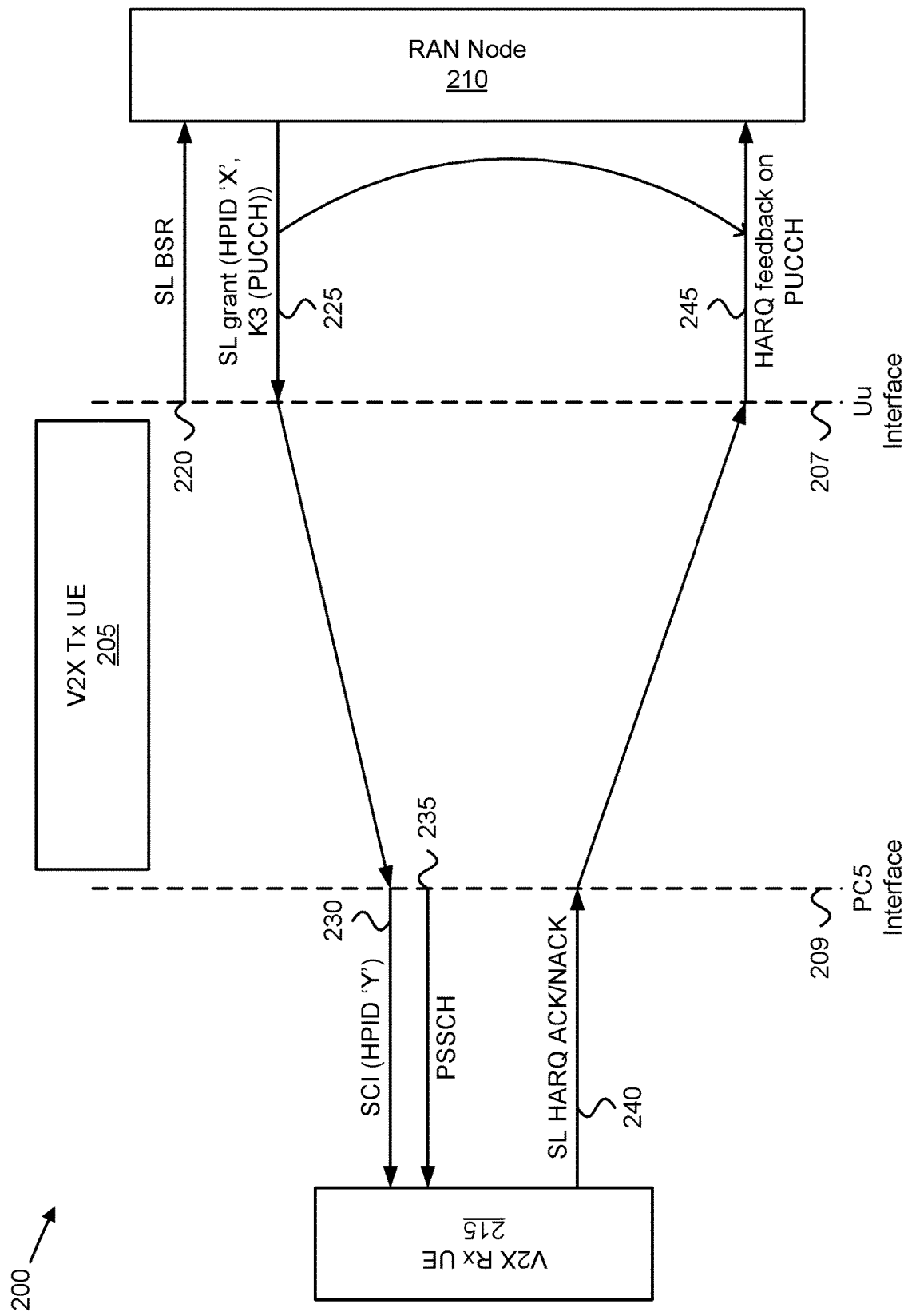
FIG. 2 is a diagram illustrating one embodiment of a signaling flow for a transmitting V2X UE.

FIG. 2 depicts a signaling flow diagram 200 for SL HARQ operation by a V2X transmitting UE 205 ("V2X Tx UE"), according to a first solution. In the first solution, a UE 205 that receives a SL grant 225 on PDCCH from the RAN node 210 (e.g., via the Uu interface 207), then chooses autonomously a SL HARQ process for the corresponding SL transmission, e.g., PSSCH transmission 235. The V2X Tx UE 205 sends a feedback message 245 to the RAN node 210 (e.g., gNB) after a predefined time offset. Here, the feedback message 245 either indicates the successful reception of the scheduled SL transmission or, respectively, requests an additional SL resource for the HARQ retransmission of the SL transmission scheduled by the SL grant. Note that the depicted V2X Tx UE 205 operates in a network-scheduled V2X mode (e.g., Mode-1).

As depicted in the signaling flow diagram 200, the UE 205 first sends a SL buffer status report ("SL BSR") 220 to the RAN node 210 indicating the amount of SL data available for transmission. In response, the RAN node 210 may allocate SL resources for the transmission of the indicated SL data by sending a SL grant 225 (i.e., in DCI) on the PDCCH.

According to one implementation of the first solution, the SL grant 225 contains an indication of a HARQ process ID and a New Data Indicator (NDI). Both fields are merely used to identify whether the SL grant 225 is allocating SL resource for a HARQ retransmission of a previously scheduled SL TB or allocating SL resources for an initial HARQ transmission. For example, a SL grant received with an un-toggled NDI value (compared to the NDI value of the last received SL grant for the same HARQ process ID) allocates SL resources for a HARQ retransmission, whereas a SL grant received with a toggled NDI value allocates SL resources for an initial HARQ transmission.

According to an alternative implementation, instead of a HARQ process ID field, a new field may be signaled within the DCI which identifies the SL grant, e.g., referred to as "SL grant identifier (ID)." Here, the "SL grant ID" field together with the NDI field indicates to a V2X Tx UE 205 whether the SL grant allocates SL resources for 1) an initial HARQ transmission or 2) a HARQ retransmission. Accordingly, a SL grant received with an un-toggled NDI value (compared to the NDI value of the last received SL grant for the same SL grant ID or HARQ process ID) allocates SL resources for a HARQ retransmission, whereas a SL grant received with a toggled NDI value allocates SL resources for an initial HARQ transmission.

The SL grant 225 may further allocate resources, e.g., PUCCH resources, and/or HARQ feedback timing related information, providing information on which resource and/or when the HARQ feedback should be transmitted, e.g., relative to the reception of the SL grant on PDCCH. Such feedback 245 indicates to the RAN node 210 whether the PSSCH transmission 235 scheduled by the SL grant 225 was successfully received/decoded by the receiving V2X UE(s) 215 or whether the V2X Tx UE 205 requests SL resource for a HARQ retransmission of the TB sent on the PSSCH.

The SL grant 225 may further signal the redundancy version ("RV") which the V2X Tx UE 205 is to use for the corresponding transmission of the TB on the PSSCH. According to a further implementation, the SL grant 225 may also allocate SL resources for the HARQ feedback 245 corresponding to the PSSCH transmission 235 on the PC5 interface 209.

Upon reception of the SL grant 225 on PDCCH, the V2X Tx UE 205 generates the TB according to the assigned transmission parameter signaled within the SL grant and transmits it on the SL resources allocated by the SL grant 225. To be more specific, the V2X Tx UE 205 selects a SL HARQ process for the transmission of the TB (SL-SCH), e.g., one of the transmitting Sidelink HARQ processes associated with the Sidelink HARQ Entity for which there is no pending HARQ retransmission. The ID of the selected HARQ process is signaled within the SCI 230 accompanying the PSSCH transmission 235.

The SCI 230 transmitted on the PSCCH may further contain the SL resource for the SL HARQ feedback 240, e.g., ACK/NACK, to be sent by the V2X receiving UE(s) 215 as e.g., allocated by the SL grant 225 sent from the RAN node 210. The SCI 230 may further contain a new data indicator ("NDI"), providing information to the receiving UE(s) 215 on whether the PSSCH transmission 235 conveys an initial HARQ transmission or a HARQ retransmission. The HARQ process ID together with the NDI is used by the receiving V2X UE(s) 215 for the HARQ soft buffer management, e.g., soft combining.

It should be noted that in addition to the HARQ process ID and the NDI, the Source Layer-2 ID may also need to be considered for the HARQ soft buffer management at a receiving UE 215, e.g., only PSSCH transmission from the same source ID are to be soft combined. Upon having sent the SCI 230 (PSCCH) and the SL MAC PDU (TB) 235 on the PSSCH, the V2X Tx UE 205 receives the SL HARQ feedback 240 on the allocated SL resource. In case the SL HARQ feedback 240 indicates a NACK (e.g., indicating that the TB was not successfully received), the V2X Tx UE 205 requests a SL resource for the retransmission of the TB from the RAN node 210. Such retransmission request is transmitted on the resources allocated by the SL grant, e.g., on PUCCH. Note that the V2X Tx UE 205 may track SL HARQ feedback responses to ensure that each V2X receiving UE successfully receives the SL MAC PDU (TB) at least once.

Figure 3:
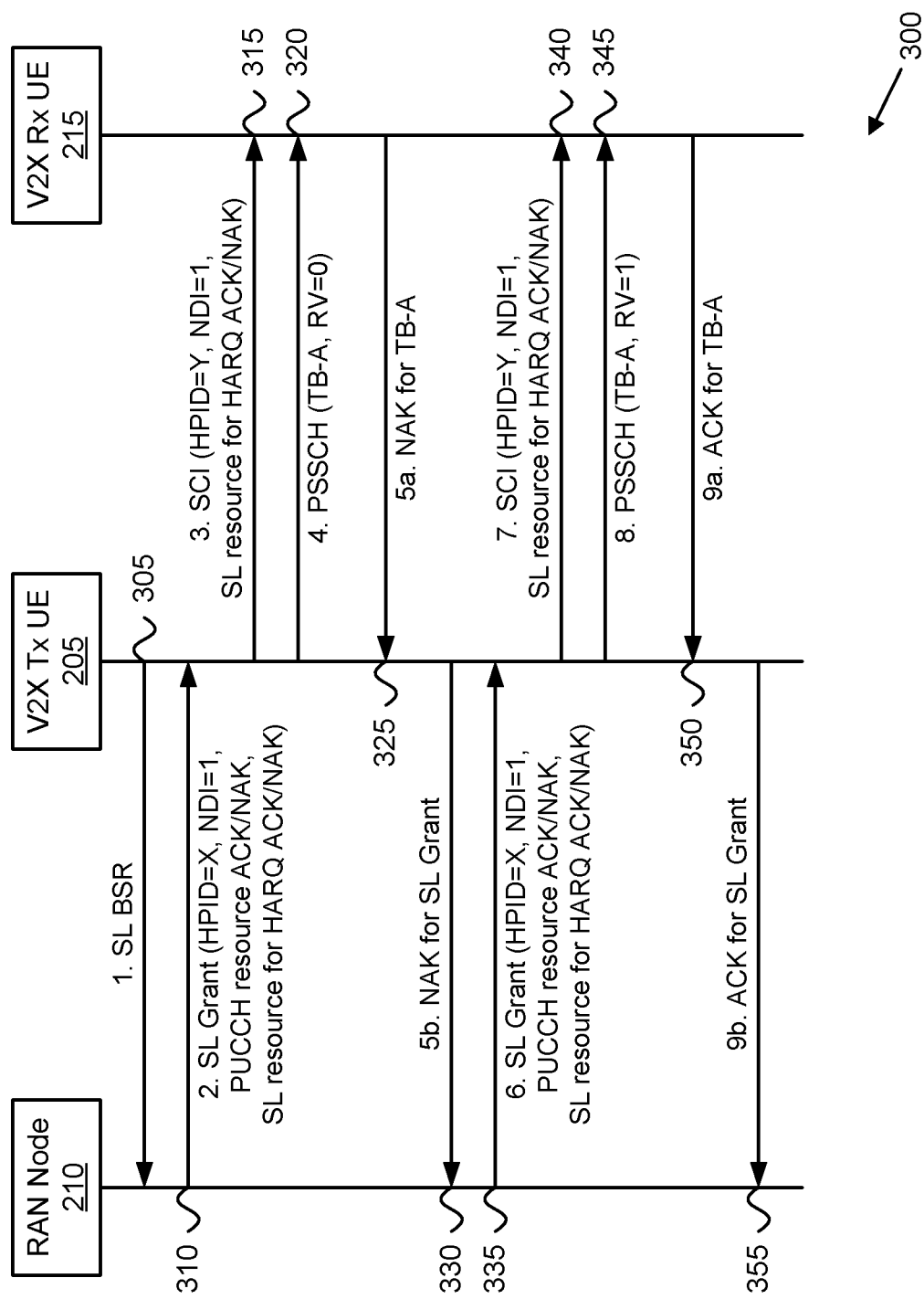
FIG. 3 is a diagram illustrating one embodiment of a signaling flow for sidelink data transfer.

FIG. 3 depicts a signaling flow diagram 300 for SL data transfer, according to embodiments of the disclosure. The signaling flow diagram 300 involves a V2X Tx UE 205, the RAN node 210, and at least one V2X Rx UE 215. The V2X Tx UE 205 sends a SL BSR to the RAN node 210 (see messaging 305). The RAN node 210 then allocates SL resources to the V2X Tx UE 205 (see messaging 310). Note that in this case, the SL resources are for the initial HARQ transmission of a first TB ("TB-A"). Here, the SL grant also allocates a PUCCH resource for HARQ feedback (i.e., ACK/NACK) and a SL resource for SL HARQ feedback.

As depicted, the RAN node 210 indicates a first HARQ process ID (e.g., HPID=X) in the SL grant. The V2X Tx UE 205 maps the first HARQ process ID to a SL HARQ process having a second HARQ process ID (e.g., HPID=Y) for the SL transmission on the PC5 interface. The V2X Tx UE 205 transmits SCI to the V2X Rx UE(s) 215 and further transmits the TB-A on PSSCH (see messaging 315 and 320).

The SCI (PSCCH) accompanying a SL-SCH transmission on PSSCH signals the second HARQ process ID of the UE-selected HARQ process and an NDI (see messaging 315). Note that the second HARQ process ID and the NDI only needs to be signaled within the SCI, when SL HARQ feedback, e.g., ACK/NACK, is requested from the receiving UE 215 in response to the SL-SCH transmission. Therefore, there may be two different SCI formats for NR V2X operation, one which is used when HARQ feedback is requested from the receiving UE 215 and one SCI for SL-SCH transmissions without HARQ feedback. According to a further implementation, the SCI which is used for SL-SCH with HARQ feedback may also allocate SL resources for the HARQ feedback from the receiving UE(s) 215. Alternatively, and/or additionally, the SCI may indicate the timing of the HARQ feedback relative to the PSSCH or PSCCH reception.

In the depicted embodiment, at least one V2X Rx UE 215 does not receive the TB-A successfully and thus sends negative feedback (i.e., HARQ NACK) corresponding to the SL HARQ process ID 'Y' to the V2X Tx UE 205 (see messaging 325). Consequently, the V2X Tx UE 205 sends HARQ NACK to the RAN node 210 on PUCCH for the SL grant corresponding to the HARQ process ID 'X' (see messaging 330). The RAN node 210 then allocates SL resources to the V2X Tx UE 205 (see messaging 335). Note that in this case, the SL resources are for the HARQ retransmission of the TB-A. Again, the SL grant also allocates a PUCCH resource for HARQ feedback (i.e., ACK/NACK) and a SL resource for SL HARQ feedback. Note that the SL grant is for the same HARQ process (i.e., HPID='X').

The V2X Tx UE 205 transmits SCI to the V2X Rx UE(s) 215 and further retransmits the TB-A on PSSCH (see messaging 340 and 345). Again, the SCI indicates the same second HARQ process ID (i.e., HPID='Y') and a non-toggled NDI (see messaging 340). This time the V2X Rx UE 215 successfully receives the TB-A and thus sends positive feedback (i.e., HARQ ACK) corresponding to the SL HARQ process ID 'Y' to the V2X Tx UE 205 (see messaging 350). Consequently, the V2X Tx UE 205 sends HARQ ACK to the RAN node 210 on PUCCH for the SL grant corresponding to the HARQ process ID 'X' (see messaging 355). Recall that the V2X Tx UE 205 may track the SL HARQ feedback received from the V2X Rx UEs 215 to ensure that each V2X Rx UE 215 successfully receives the TB-A at least once.

According to a second solution, for each carrier/serving cell there is one Sidelink HARQ Entity at the MAC entity for transmission(s) on SL-SCH, which maintains a number of parallel Sidelink HARQ processes. The Sidelink HARQ processes are shared across all SL transmissions irrespective of the cast type of the SL transmission, e.g., unicast, groupcast or broadcast SL transmission, and irrespective of the resource allocation mode, e.g., RAN-scheduled mode (Mode-1) or UE-autonomous mode (Mode-2).

According to one implementation of the second solution, a SL grant and its associated HARQ information are associated with a Sidelink HARQ process. The V2X Tx UE 205 selects the HARQ process for a SL transmission autonomously according to this embodiment and delivers the HARQ information to the corresponding SL HARQ process. The HARQ information contains at least the HARQ process ID of the selected HARQ process for a SL transmission and may further contain a New Data Indicator (NDI), indicating whether the corresponding SL transmission is an initial HARQ transmission or a HARQ retransmission.

According to a third solution, a transmitting V2X UE 205 may switch the cast type for different HARQ (re)transmissions of a TB transmitted on the PSSCH. In one implementation of the third solution, a V2X Tx UE 205 performs the initial transmission of a TB in a groupcast mode, whereas potential HARQ retransmission are performed in the unicast mode, e.g., HARQ retransmission are performed to individual V2X receiving UEs 215. For the initial transmission of the TB, the V2X Tx UE 205 selects one of the SL HARQ processes of the SL HARQ entity, e.g., a SL HARQ process for which there is no pending HARQ (re)transmission, as discussed above.

As mentioned above, the initial transmission may be a groupcast transmission to a group of V2X receiving UEs 215. In case one or multiple UEs of the group are not able to successfully decode the TB, the V2X Tx UE 205 may then perform individual unicast HARQ retransmissions to those UEs. In one implementation, each unicast HARQ transmission is performed in a separate HARQ process. However, in another implementation of the third solution, the Tx UE 205 reuses the SL HARQ process selected for the initial transmission for the (multiple) unicast HARQ retransmissions to the different receiving UEs 215.

For each HARQ retransmission to one of the receiving UEs 215, the V2X Tx UE 205 may choose a different redundancy version. Even though only one (and the same) SL HARQ process is used for each of the multiple unicast transmissions to different Rx UEs 215, the V2X Tx UE 205 maintains an independent HARQ status/context, e.g., RV, NDI status, received HARQ feedback, for each of the receiving UEs 215. In various embodiments, the SL HARQ process can be used for a new TB transmission, e.g., initial transmission, only if all of the receiving UEs 215 have successfully received the TB (e.g., no retransmissions are pending for the SL HARQ process).

For unicast re-transmission, the V2X Tx UE 205, while making re-transmissions, may use the destination ID of each of the receiving UE that failed in decoding the said PSSCH transmission (assume here that 'm' Rx UEs fail to successfully receive a TB in PSSCH) and make 'm' SCI/PSSCH transmissions (where 'm' is an integer less than or equal to the number of members of the group of V2X receiving UEs 215). In certain embodiments, beamforming may be used for such 'm' unicast transmissions, e.g., with knowledge of the channel state of the specific PC5 channel. In certain embodiments, if the number of unicast transmission (e.g., 'm') is greater than a certain (pre)configured number, then the Tx UE 205 may continue re-transmissions in groupcast manner (e.g., instead of switching to unicast re-transmission).

Figure 4:
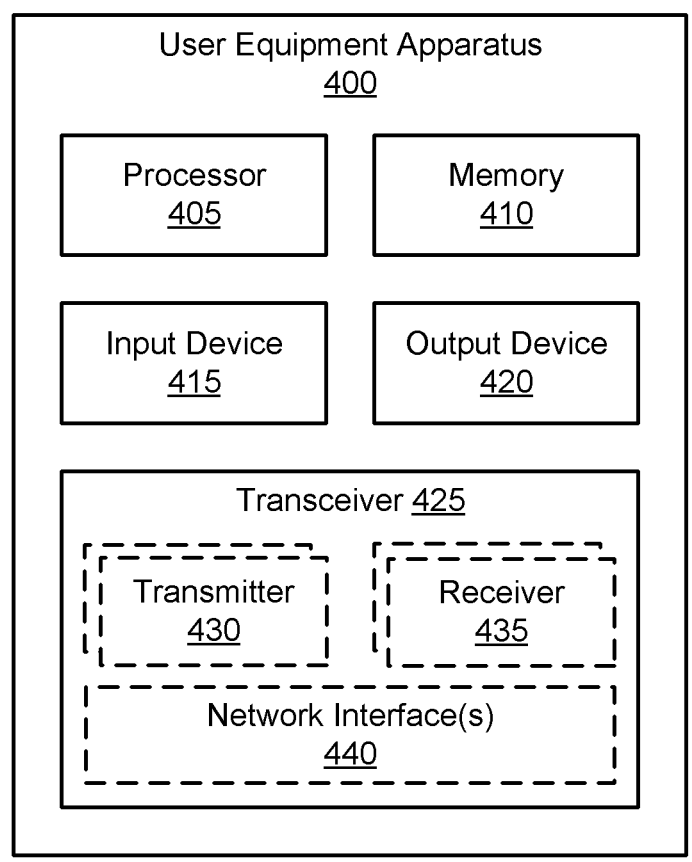
FIG. 4 is a diagram illustrating one embodiment of a user equipment apparatus that may be used for sidelink HARQ operation.

FIG. 4 depicts a user equipment apparatus 400 that may be used for sidelink HARQ operation in NR V2X communication, according to embodiments of the disclosure. In various embodiments, the user equipment apparatus 400 is used to implement one or more of the solutions described above. The user equipment apparatus 400 may be one embodiment of the remote unit 105 and/or Tx UE 205, described above. Furthermore, the user equipment apparatus 400 may include a processor 405, a memory 410, an input device 15, an output device 420, and a transceiver 425. In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 controls the user equipment apparatus 400 to implement the above described UE behaviors. In some embodiments, the transceiver 425 receives a SL grant for data transmission using SL resources. Here, the SL grant has a first HARQ process identifier (i.e., network HARQ process ID). The processor 405 selects a second HARQ process identifier (i.e., SL HARQ process ID) for the data transmission using SL resources. Via the transceiver 425, the processor 405 transmits SCI containing the second HARQ process identifier and transmits the SL data using the SL resources.

In some embodiments, the transmitter sends HARQ feedback for the first HARQ process corresponding to the SL data transmission. In such embodiments, the SL grant indicates a physical uplink control channel resource and/or HARQ feedback timing information, where transmitting HARQ feedback for the data transmission for the first HARQ process is based on the SL grant. Note that in other embodiments, the SL grant for data transmission may indicate the first HARQ process identifier without scheduling PUCCH resources.

In some embodiments, the first HARQ process identifier received in the SL grant (e.g., received in DCI) is different than the SL HARQ process identifier signaled within the SCI. In some embodiments, the selected HARQ process is associated with a SL HARQ process for which there is no pending HARQ retransmission. In various embodiments, the processor maps the first HARQ process to the SL HARQ process, where the SL HARQ process is selected independently from the first HARQ process.

In some embodiments, selecting the SL HARQ process includes autonomously selecting a SL HARQ process from a pool of configured SL HARQ processes. In certain embodiments, the pool of configured SL HARQ processes is shared between network-scheduled SL data transfer and UE-scheduled SL data transfer. In certain embodiments, the pool of configured SL HARQ processes is shared between unicast SL transmissions, groupcast SL transmission, and broadcast SL transmissions.

In some embodiments, transmitting the SL data using the SL resources includes transmitting SCI containing a SL HARQ process identifier for the SL HARQ process, the transceiver receives SL HARQ feedback for the SL HARQ process from at least one UE. In such embodiments, the SCI further contains a new data indicator, wherein a receiving UE performs soft-combining of the transmitted SL data based on at least the SL HARQ process identifier and the new data indicator. In further embodiments, the receiving UE performs soft-combining of the transmitted SL data also considering the source Layer-2 identifier.

In some embodiments, transmitting the SL data includes performing a groupcast transmission and receiving SL HARQ feedback corresponding to the SL data transmission includes receiving a negative acknowledgement indication. In such embodiments, the processor retransmits the SL data using unicast SL retransmission. In certain embodiments, the unicast SL retransmission reuses the SL HARQ process identifier. In certain embodiments, the unicast SL retransmission uses a different redundancy version than the initial SL data transmission.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to SL HARQ operation. For example, the memory 410 may store V2X communication resources, HARQ processes, HARQ process ID mappings, and the like. In certain embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. Additionally, the transceiver 425 may support at least one network interface 440. Here, the at least one network interface 440 facilitates communication with a RAN node, such as an eNB or gNB, for example using the "Uu" interface (e.g., LTE-Uu for eNB, NR-Uu for gNB). Additionally, the at least one network interface 440 may include an interface used for communications with one or more network functions in the mobile core network, such as a UPF 141, an AMF 143, and/or a SMF 145.

In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an application-specific integrated circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module. In certain embodiments, the transceiver 425 may implement a 3GPP modem (e.g., for communicating via NR or LTE access networks) and a non-3GPP modem (e.g., for communicating via Wi-Fi or other non-3GPP access networks).

Figure 5:
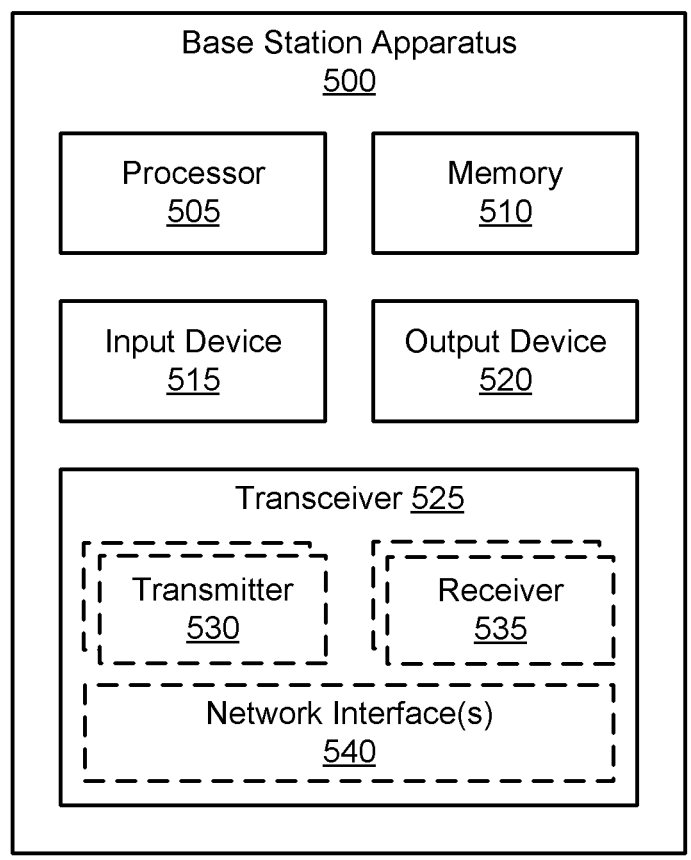
FIG. 5 is a diagram illustrating one embodiment of a base station apparatus that may be used for sidelink HARQ operation.

FIG. 5 depicts a base station apparatus 500 that may be used for protecting the user identity and credentials, according to embodiments of the disclosure. In various embodiments, the base station apparatus 500 is used to implement one or more of the solutions described above. The base station apparatus 500 may be one embodiment of the AMF, described above. Furthermore, the base station apparatus 500 may include a processor 505, a memory 510, an input device 515, an output device 520, and a transceiver 525. In some embodiments, the input device 515 and the output device 520 are combined into a single device, such as a touchscreen. In certain embodiments, the base station apparatus 500 may not include any input device 515 and/or output device 520. In various embodiments, the base station apparatus 500 may include one or more of: the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the base station apparatus 500 to implement the above described RAN node behaviors. For example, the processor 505 may control the transceiver 525 to send a SL grant to a Tx UE for data transmission using SL resources, the SL grant having a first HARQ process identifier. Where, the SL grant for data transmission schedules PUCCH resources for HARQ feedback corresponding to the first HARQ process identifier, the transmitter transceiver 525 receives HARQ feedback for the first HARQ process corresponding to the SL data transmission.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to sidelink HARQ operation. For example, the memory 510 may store V2X communication resources, HARQ process IDs, UE configurations, and the like. In certain embodiments, the memory 510 also stores program code and related data, such as an operating system or other controller algorithms operating on the base station apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the base station apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to send messages to the RAN, as described herein. Similarly, one or more receivers 535 may be used to receive messages from the RAN, as described herein. Although only one transmitter 530 and one receiver 535 are illustrated, the base station apparatus 500 may have any suitable number of transmitters 530 and receivers 535. Further, the transmitter(s) 530 and the receiver(s) 535 may be any suitable type of transmitters and receivers.

In various embodiments, the transceiver 525 supports one or more network interfaces 540 for communicating with a UE and/or network function. For example, the transceiver 525 may support an "Uu" interface with the UE. Additionally, the transceiver 525 may support various 5GC service interfaces, such as the N2 interface and/or N3 interface.

Figure 6:
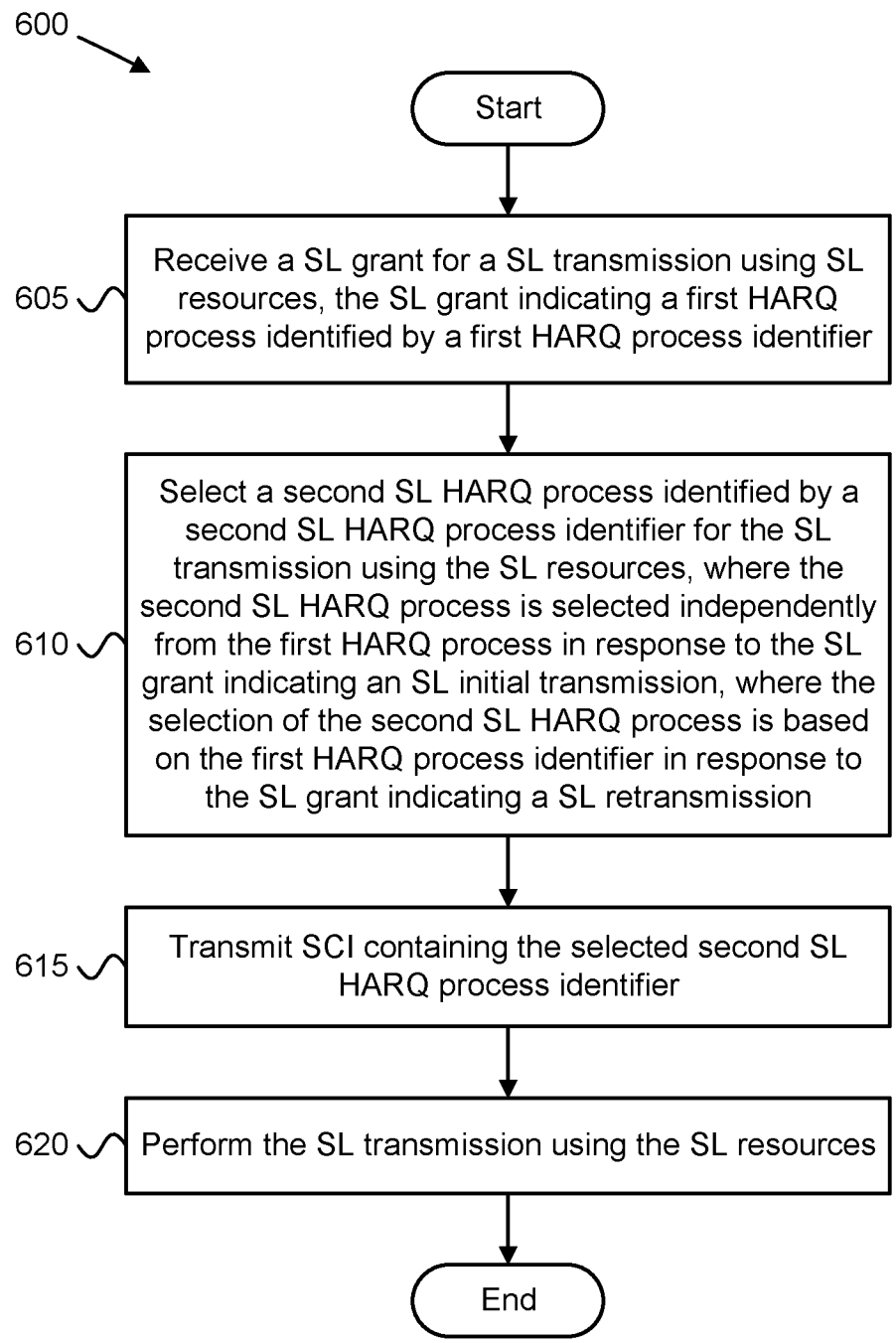
FIG. 6 is a flowchart diagram illustrating one embodiment of a method that may be used for sidelink HARQ operation.

FIG. 6 depicts one embodiment of a method 600 for sidelink HARQ operation, according to embodiments of the disclosure. In various embodiments, the method 600 is performed by a UE, such as the remote unit 105, the Tx UE 205, and/or the user equipment apparatus 400, described above. In some embodiments, the method 600 is performed by a processor, such as a microcontroller, a microprocessor, a CPU, a GPU, an auxiliary processing unit, a FPGA, or the like.

The method 600 begins and receives 605 a SL grant for a SL transmission using SL resources. Here, the SL grant indicates a first HARQ process identified by a first HARQ process identifier. The method 600 includes selecting 610 a second SL HARQ process identified by a second SL HARQ process identifier for the SL transmission using the SL resources. Here, the second SL HARQ process is selected independently from the first HARQ process in response to the SL grant indicating an SL initial transmission and the selection of the second SL HARQ process is based on the first HARQ process identifier in response to the SL grant indicating a SL retransmission. The method 600 includes transmitting 615 SCI containing the selected second SL HARQ process identifier. The method 600 includes performing the SL transmission using the SL resources. The method 600 ends.

Disclosed herein is a first apparatus for sidelink HARQ operation, according to embodiments of the disclosure. The first apparatus may be implemented by a UE, such as the remote unit 105, the Tx UE 205, and/or the user equipment apparatus 400. The first apparatus includes a transceiver that receives a SL grant for data transmission using SL resources, the SL grant having a first HARQ process identifier. The first apparatus includes a processor that selects a second HARQ process identifier for the data transmission using SL resources. Via the transceiver, the processor transmits SCI containing the second HARQ process identifier and transmits the SL data using the SL resources.

In some embodiments, the transmitter sends HARQ feedback for the first HARQ process corresponding to the SL data transmission. In such embodiments, the SL grant indicates a physical uplink control channel resource and/or HARQ feedback timing information, where transmitting HARQ feedback for the data transmission for the first HARQ process is based on the SL grant. Note that in other embodiments, the SL grant for data transmission may indicate the first HARQ process identifier without scheduling PUCCH resources.

In some embodiments, the first HARQ process identifier received in the SL grant (e.g., received in DCI) is different than the second HARQ process identifier signaled within the SCI. In some embodiments, the selected HARQ process is associated with a second HARQ process for which there is no pending HARQ retransmission. In various embodiments, the processor maps the first HARQ process to the second HARQ process, where the second HARQ process is selected independently from the first HARQ process.

In some embodiments, selecting the second HARQ process includes autonomously selecting a second HARQ process from a pool of configured second HARQ processes. In certain embodiments, the pool of configured second HARQ processes is shared between network-scheduled SL data transfer and UE-scheduled SL data transfer. In certain embodiments, the pool of configured second HARQ processes is shared between unicast SL transmissions, groupcast SL transmission, and broadcast SL transmissions.

In some embodiments, transmitting the SL data using the SL resources includes transmitting SCI containing a second HARQ process identifier for the second HARQ process, the transceiver receives SL HARQ feedback for the second HARQ process from at least one UE. In such embodiments, the SCI further contains a new data indicator, wherein a receiving UE performs soft-combining of the transmitted SL data based on at least the second HARQ process identifier and the new data indicator. In further embodiments, the receiving UE performs soft-combining of the transmitted SL data also considering the source Layer-2 identifier.

In some embodiments, transmitting the SL data includes performing a groupcast transmission and receiving SL HARQ feedback corresponding to the SL data transmission includes receiving a negative acknowledgement indication. In such embodiments, the processor retransmits the SL data using unicast SL retransmission. In certain embodiments, the unicast SL retransmission reuses the second HARQ process identifier. In certain embodiments, the unicast SL retransmission uses a different redundancy version than the initial SL data transmission.

Disclosed herein is a first method for sidelink HARQ operation, according to embodiments of the disclosure. The first method may be performed by a UE, such as the remote unit 105, the Tx UE 205, and/or the user equipment apparatus 400. The first method includes receiving a SL grant for data transmission using SL resources. Here, the SL grant indicates a first HARQ process identified by a first HARQ process identifier. The first method includes selecting a second HARQ process identified by a second HARQ process identifier for the data transmission using SL resources. The first method includes transmitting SCI containing the selected second HARQ process identifier and transmitting the SL data using the SL resources.

In some embodiments, the first method includes transmitting HARQ feedback for the first HARQ process corresponding to the SL data transmission. In such embodiments, the SL grant indicates a physical uplink control channel resource and/or HARQ feedback timing information, where transmitting HARQ feedback for the data transmission for the first HARQ process is based on the SL grant. Note that in other embodiments, the SL grant for data transmission may indicate the first HARQ process identifier without scheduling PUCCH resources.

In some embodiments, the first HARQ process identifier received in the SL grant (e.g., received in DCI) is different than the second HARQ process identifier signaled within the SCI. In some embodiments, the selected HARQ process is associated with a second HARQ process for which there is no pending HARQ retransmission. In various embodiments, the first method includes mapping the first HARQ process to the second HARQ process, where the second HARQ process is selected independently from the first HARQ process.

In some embodiments, selecting the second HARQ process includes autonomously selecting a second HARQ process from a pool of configured second HARQ processes. In certain embodiments, the pool of configured second HARQ processes is shared between network-scheduled SL data transfer and UE-scheduled SL data transfer. In certain embodiments, the pool of configured second HARQ processes is shared between unicast SL transmissions, groupcast SL transmission, and broadcast SL transmissions.

In some embodiments, transmitting the SL data using the SL resources includes transmitting SCI containing a second HARQ process identifier for the second HARQ process, the first method further including receiving SL HARQ feedback for the second HARQ process from at least one UE. In such embodiments, the SCI further contains a new data indicator, wherein a receiving UE performs soft-combining of the transmitted SL data based on at least the second HARQ process identifier and the new data indicator. In further embodiments, the receiving UE performs soft-combining of the transmitted SL data also considering the source Layer-2 identifier.

In some embodiments, transmitting the SL data includes performing a groupcast transmission and receiving SL HARQ feedback corresponding to the SL data transmission includes receiving a negative acknowledgement indication. In such embodiments, the processor retransmits the SL data using unicast SL retransmission. In certain embodiments, the unicast SL retransmission reuses the second HARQ process identifier. In certain embodiments, the unicast SL retransmission uses a different redundancy version than the initial SL data transmission.

Disclosed herein is a second apparatus for wireless communication, according to embodiments of the disclosure. The second apparatus may be implemented by a UE, such as the remote unit 105, the Tx UE 205, and/or the user equipment apparatus 400. The second apparatus includes a memory coupled to a processor, where the processor is configured to cause the second apparatus to: A) receive a SL grant for a SL transmission using SL resources, the SL grant indicating a first HARQ process identified by a first HARQ process identifier; B) select a second SL HARQ process identified by a second SL HARQ process identifier for the SL transmission using the SL resources, where the second SL HARQ process is selected independently from the first HARQ process in response to the SL grant indicating an SL initial transmission, and where the selection of the second SL HARQ process is based on the first HARQ process identifier in response to the SL grant indicating a SL retransmission; C) transmit SCI containing the second SL HARQ process identifier; and D) perform the SL transmission using the SL resources.

In some embodiments, the processor is further configured to cause the second apparatus to transmit HARQ feedback for the first HARQ process, the HARQ feedback corresponding to the SL transmission using the SL resources. In certain embodiments, the SL grant indicates a physical uplink control channel resource and/or HARQ feedback timing information, wherein transmitting the HARQ feedback for the first HARQ process is based on the SL grant.

In some embodiments, to select the second SL HARQ process, the processor is configured to cause the second apparatus to autonomously select a second SL HARQ process from a set of SL HARQ processes. In certain embodiments, the set of SL HARQ processes is shared between network-scheduled SL transmissions and UE-scheduled SL transmissions. In certain embodiments, the set of SL HARQ processes is shared between unicast SL transmissions, groupcast SL transmission, and broadcast SL transmissions.

In some embodiments, the first HARQ process identifier received in the SL grant is different than the second SL HARQ process identifier signaled within the SCI. In some embodiments, the selected second SL HARQ process is associated with a second SL HARQ process for which there is no pending SL HARQ retransmission.

In some embodiments, the processor is further configured to map the first HARQ process to the second SL HARQ process. In some embodiments, the processor is further configured to associate the selected second SL HARQ process to the SL grant.

In some embodiments, the processor is further configured to associate the second SL HARQ Process identifier corresponding to the second SL HARQ process to the SL grant. In some embodiments, the processor is further configured to select the second SL HARQ process being associated with the SL grant in response to the SL grant indicating a SL retransmission.

In some embodiments, to perform the SL transmission using the SL resources, the processor is configured to cause the second apparatus to transmit the SCI containing the second SL HARQ process identifier for the second SL HARQ process, wherein the processor is further configured to cause the second apparatus to receive SL HARQ feedback for the second SL HARQ process from at least one UE.

In certain embodiments, to perform the SL transmission using the SL resources, the processor is configured to cause the second apparatus to perform an initial groupcast transmission. In such embodiments, in response to the received SL HARQ feedback including a negative acknowledgement indication, the processor is configured to cause the second apparatus to retransmit the SL transmission using unicast SL retransmission.

In one embodiment, the unicast SL retransmission reuses the second HARQ process identifier. In another embodiment, the unicast SL retransmission uses a different redundancy version than the initial groupcast transmission. In certain embodiments, SCI further contains an NDI, wherein a receiving UE performs the soft-buffer management for the received SL transmission based on at least the second SL HARQ process identifier, the source ID and the NDI.

Disclosed herein is a second method for sidelink HARQ operation, according to embodiments of the disclosure. The second method may be performed by a UE, such as the remote unit 105, the Tx UE 205, and/or the user equipment apparatus 400. The second method includes receiving a SL grant for a SL transmission using SL resources, the SL grant indicating a first HARQ process identified by a first HARQ process identifier and selecting a second SL HARQ process identified by a second SL HARQ process identifier for the SL transmission using the SL resources. Here, the second SL HARQ process is selected independently from the first HARQ process in response to the SL grant indicating an initial SL transmission, where the selection of the second SL HARQ process based on the first HARQ process identifier in response to the SL grant indicating a SL retransmission. The second method includes transmitting SCI containing the selected second SL HARQ process identifier and performing the SL transmission using the SL resources.

In some embodiments, the second method includes transmitting HARQ feedback for the first HARQ process, the HARQ feedback corresponding to the SL transmission using the SL resources. In certain embodiments, the SL grant indicates a physical uplink control channel resource and/or HARQ feedback timing information, wherein transmitting the HARQ feedback for the first HARQ process is based on the SL grant.

In some embodiments, selecting the second SL HARQ process includes autonomously selecting a second SL HARQ process from a set of SL HARQ processes. In certain embodiments, the set of SL HARQ processes is shared between network-scheduled SL transmissions and UE-scheduled SL transmissions. In certain embodiments, the set of SL HARQ processes is shared between unicast SL transmissions, groupcast SL transmission, and broadcast SL transmissions.

In some embodiments, the first HARQ process identifier received in the SL grant is different than the second SL HARQ process identifier signaled within the SCI. In some embodiments, the selected second SL HARQ process is associated with a second SL HARQ process for which there is no pending SL HARQ retransmission.

In some embodiments, the second method includes mapping the first HARQ process to the second SL HARQ process. In some embodiments, the second method includes associating the selected second SL HARQ process to the SL grant.

In some embodiments, the second method includes associating the second SL HARQ Process identifier corresponding to the second SL HARQ process to the SL grant. In some embodiments, the second method includes selecting the second SL HARQ process being associated with the SL grant in response to the SL grant indicating a SL retransmission.

In some embodiments, performing the SL transmission using the SL resources includes transmitting the SCI containing the second SL HARQ process identifier for the second SL HARQ process. In such embodiments, the second method includes receiving SL HARQ feedback for the second SL HARQ process from at least one UE.

In certain embodiments, performing the SL transmission using the SL resources includes performing an initial groupcast transmission. In such embodiments, in response to the received SL HARQ feedback including a negative acknowledgement indication, the second method includes retransmitting the SL data using unicast SL retransmission.

In one embodiment, the unicast SL retransmission reuses the second HARQ process identifier. In another embodiment, the unicast SL retransmission uses a different redundancy version than the initial groupcast transmission. In certain embodiments, the SCI further contains an NDI, where a receiving UE performs the soft-buffer management for the received SL transmission based on at least the second SL HARQ process identifier, the source ID, and the NDI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication, the apparatus comprising:
 a processor; and
 a memory coupled to the processor, wherein the processor is configured to cause the apparatus to:
 receive a sidelink ("SL") grant for a SL transmission using SL resources, the SL grant indicating a first hybrid automatic repeat request ("HARQ") process identified by a first HARQ process identifier;
 select a second SL HARQ process identified by a second SL HARQ process identifier for the SL transmission using the SL resources,
  wherein the second SL HARQ process is selected independently from the first HARQ process in response to the SL grant indicating an SL initial transmission, and
  wherein the selection of the second SL HARQ process is based on the first HARQ process identifier in response to the SL grant indicating a SL retransmission;
 transmit SL control information ("SCI") containing the second SL HARQ process identifier; and
 perform the SL transmission using the SL resources.

2. The apparatus of claim 1, wherein the processor is further configured to cause the apparatus to transmit HARQ feedback for the first HARQ process, the HARQ feedback corresponding to the SL transmission using the SL resources.

3. The apparatus of claim 2, wherein the SL grant indicates a physical uplink control channel resource and/or HARQ feedback timing information, and wherein transmitting the HARQ feedback for the first HARQ process is based on the SL grant.

4. The apparatus of claim 1, wherein the first HARQ process identifier received in the SL grant is different than the second SL HARQ process identifier signaled within the SCI.

5. The apparatus of claim 1, wherein, to select the second SL HARQ process, the processor is configured to cause the apparatus to autonomously select the second SL HARQ process from a set of SL HARQ processes.

6. The apparatus of claim 5, wherein the set of SL HARQ processes is shared between unicast SL transmissions, groupcast SL transmission, and broadcast SL transmissions.

7. The apparatus of claim 1, wherein the selected second SL HARQ process is associated with a second SL HARQ process for which there is no pending SL HARQ retransmission.

8. The apparatus of claim 1, wherein the processor is further configured to map the first HARQ process to the second SL HARQ process.

9. The apparatus of claim 1, wherein the processor is further configured to associate the selected second SL HARQ process to the SL grant.

10. The apparatus of claim 1, wherein the processor is further configured to associate the second SL HARQ Process identifier corresponding to the second SL HARQ process to the SL grant.

11. The apparatus of claim 1, wherein the processor is further configured to select the second SL HARQ process being associated with the SL grant in response to the SL grant indicating the SL retransmission.

12. The apparatus of claim 1, wherein, to perform the SL transmission using the SL resources, the processor is configured to cause the apparatus to transmit the SCI containing the second SL HARQ process identifier for the second SL HARQ process, and wherein the processor is further configured to cause the apparatus to receive SL HARQ feedback for the second SL HARQ process from at least one user equipment ("UE").

13. The apparatus of claim 12,
 wherein, to perform the SL transmission using the SL resources, the processor is configured to cause the apparatus to perform an initial groupcast transmission,
 wherein the received SL HARQ feedback comprises a negative acknowledgement indication, and
 wherein the processor is configured to cause the apparatus to retransmit the SL transmission using unicast SL retransmission.

14. The apparatus of claim 13, wherein the unicast SL retransmission reuses the second HARQ process identifier.

15. A method of a remote unit comprising:
 receiving a sidelink ("SL") grant for a SL transmission using SL resources, the SL grant indicating a first hybrid automatic repeat request ("HARQ") process identified by a first HARQ process identifier;
 selecting a second SL HARQ process identified by a second SL HARQ process identifier for the SL transmission using the SL resources,
  wherein the second SL HARQ process is selected independently from the first HARQ process in response to the SL grant indicating an initial SL transmission,
  wherein the selection of the second SL HARQ process based on the first HARQ process identifier in response to the SL grant indicating a SL retransmission;
 transmitting SL control information ("SCI") containing the selected second SL HARQ process identifier; and
 performing the SL transmission using the SL resources.

16. The method of claim 15, further comprising associating the selected second SL HARQ process to the SL grant.

17. The method of claim 15, further comprising associating the second SL HARQ Process identifier corresponding to the second SL HARQ process to the SL grant.

18. The method of claim 15, wherein selecting the second SL HARQ process being associated with the SL grant occurs in response to the SL grant indicating the SL retransmission.

19. The method of claim 15, wherein performing the SL transmission using the SL resources comprises transmitting the SCI containing the second SL HARQ process identifier for the second SL HARQ process, the method further comprising receiving SL HARQ feedback for the second SL HARQ process from at least one user equipment ("UE").

20. The method of claim 19, wherein the SCI further contains a new data indicator ("NDI"), and wherein a receiving UE performs soft-buffer management for the received SL transmission based on at least the second SL HARQ process identifier, a source Identifier ("ID"), and the NDI.

* * * * *